W. A. VINSON.
TIRE INFLATER.
APPLICATION FILED DEC. 5, 1907.
1,045,760.
Patented Nov. 26, 1912.
3 SHEETS—SHEET 1.
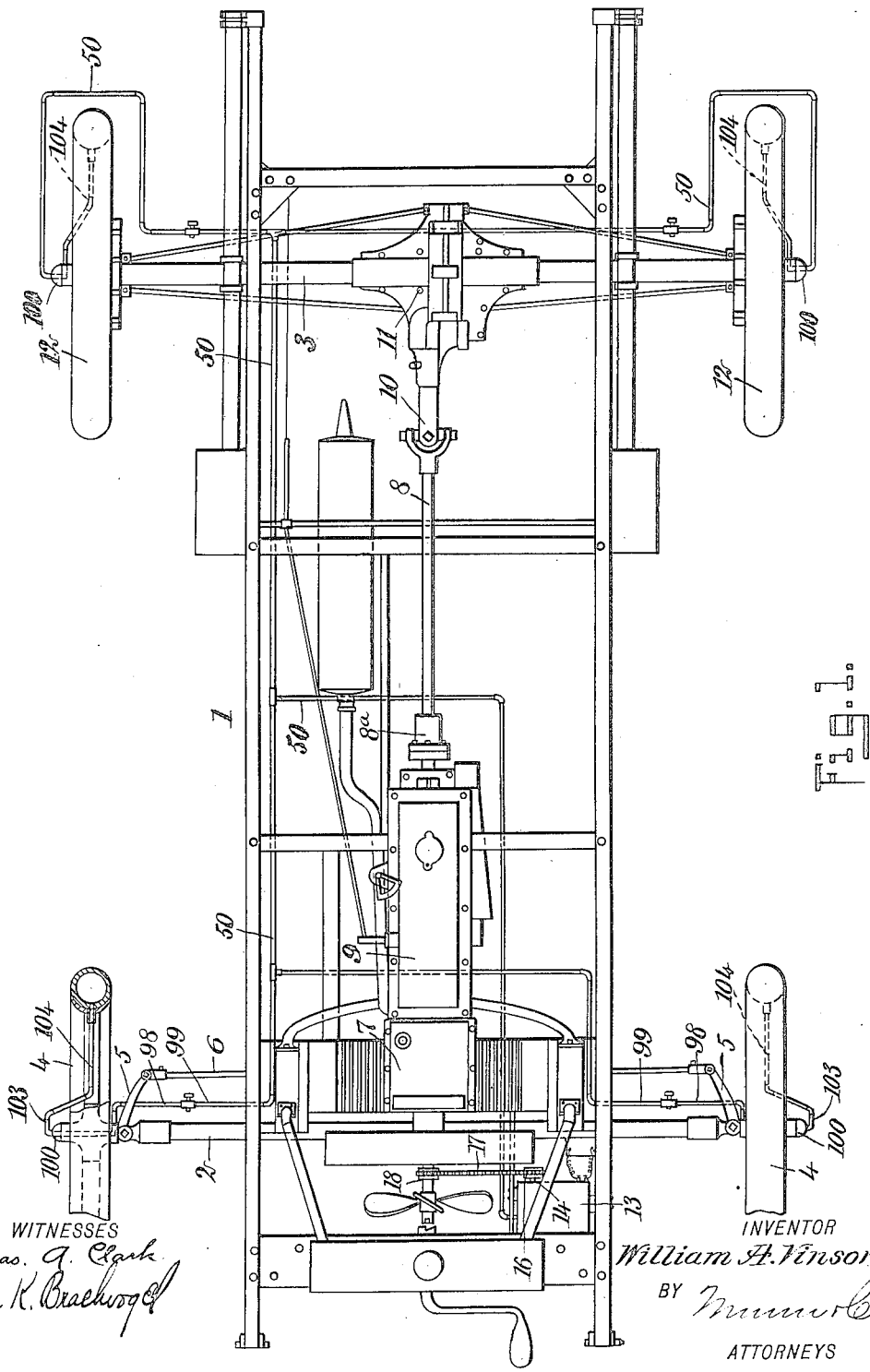
WITNESSES
Chas. J. Clark
John K. Brackway
INVENTOR
William A. Vinson
BY
ATTORNEYS

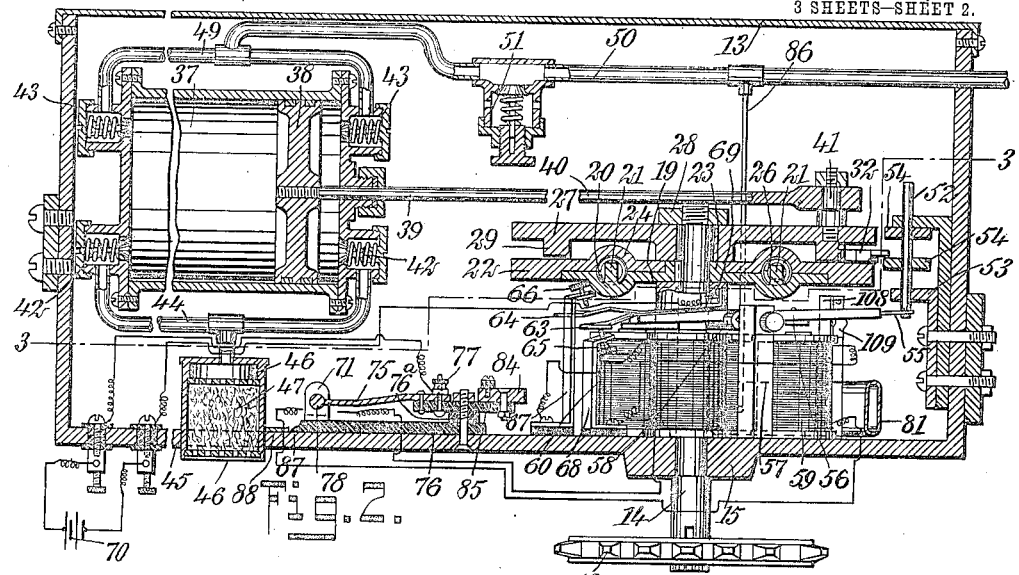

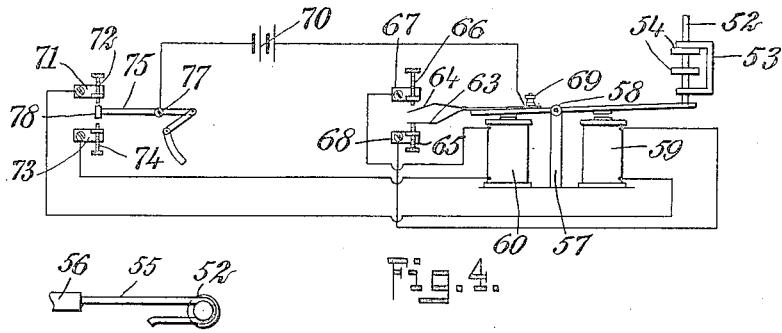
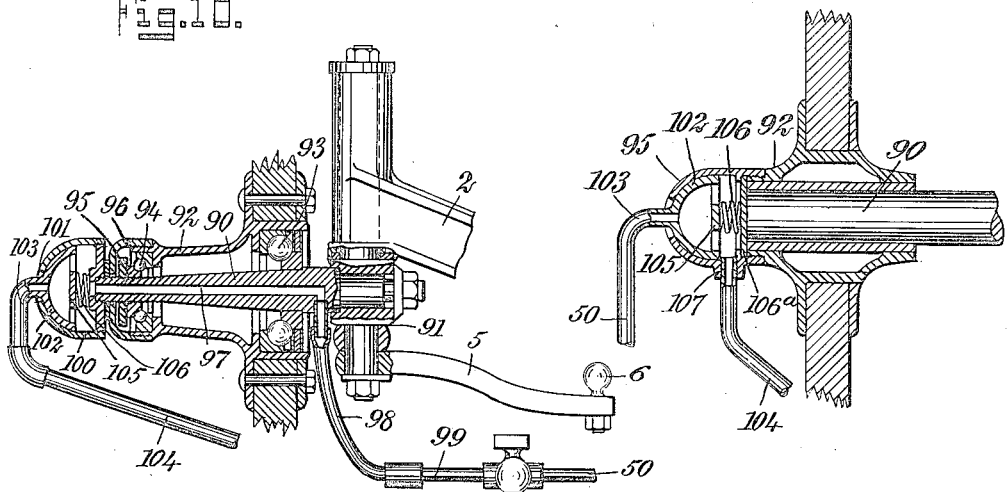
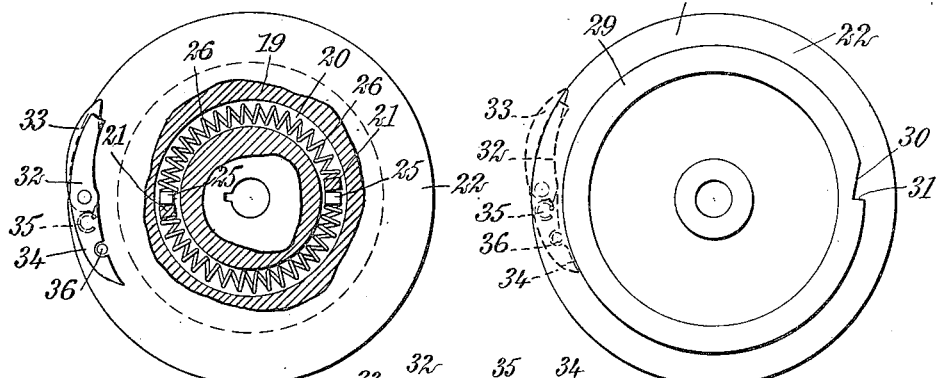

UNITED STATES PATENT OFFICE.

WILLIAM A. VINSON, OF HEALDSBURG, CALIFORNIA.

TIRE-INFLATER.

1,045,760.

Specification of Letters Patent.

Patented Nov. 26, 1912.

Application filed December 5, 1907. Serial No. 405,202.

*To all whom it may concern:*

Be it known that I, WILLIAM A. VINSON, a citizen of the United States, and a resident of Healdsburg, in the county of Sonoma and State of California, have invented a new and Improved Tire-Inflater, of which the following is a full, clear, and exact description.

This invention relates to tire inflaters, and is particularly useful in connection with motor vehicles and the like, which employ pneumatic tires.

An object of the invention is to provide a simple and efficient tire inflater adapted to be operated by the motor of an automobile or the like, and serving automatically to maintain the pneumatic tires of the vehicle inflated at a predetermined pressure.

A further object of the invention is to provide a device of the class described, for use in connection with a vehicle the wheels of which are provided with pneumatic tires and are so constructed that air from an air compressor can be introduced into the tires while the wheels are in motion.

A still further object of the invention is to provide a tire inflater for use in connection with a motor vehicle having wheels provided with pneumatic tires and an air conduit system permitting the introduction of air into said tires from an air compressor while the wheels are in motion, and having controlling mechanism for the compressor, which depends for its operation upon the air pressure within the conduit system.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a plan view of the automobile chassis, showing my invention applied thereto; Fig. 2 is an enlarged, longitudinal section of the air compressor and compressor controlling mechanism; Fig. 3 is an enlarged, transverse section on the line 3—3 of Fig. 2; Fig. 4 is a diagrammatic view showing the electrical connections and circuits of the device; Fig. 5 is an enlarged transverse section of one of the front wheels of the automobile showing parts broken away; Fig. 6 is an enlarged transverse section of one of the rear wheels; Fig. 7 is an elevation of a detail showing parts broken away; Fig. 8 is an elevation of a further detail; Fig. 9 is a side elevation of parts of the details shown in Figs. 7 and 8; and Fig. 10 is an elevation of a still further detail.

Before proceeding to a more detailed explanation of my invention, it should be understood that the majority of accidents to automobiles and other motor vehicles is due to the failure of one or more of the pneumatic tires. For instance, if a tire bursts on a rapidly traveling automobile, the latter is almost invariably turned from its proper course, usually with serious consequences to the vehicle itself and its occupants. In addition to the danger of loss or injury due to tire punctures, blow-outs and the like, these are always a source of annoyance and loss of time. Furthermore, ordinary tire leakage necessitates the frequent re-inflation of the tires, and this too constitutes a source of trouble. My device automatically keeps the tires of the automobile at a constant point of inflation which can be determined beforehand, and replaces the air which escapes from the tires due to leakage or punctures. The tire inflater also acts with great rapidity, so that should a blow-out occur, the air escaping from the tire would be almost instantly replaced, so that the vehicle could be brought to a stop safely before the tire has become completely deflated. The device is automatic in operation and requires no attention from the driver of the vehicle. If the pressure of the air in the tires falls below a certain point an air compressor is instantly started and air is pumped into the tires through a suitable air conduit system, which operates regardless of the rapidity of movement of the wheel. In connection with this conduit system I provide vehicle wheels of a peculiar construction which permit air to be introduced into the tires from the vehicle while the wheels are revolving.

Referring more particularly to the drawings, 1 represents the chassis of an automobile, which may be of any preferred or common form. The chassis or frame is mounted upon the usual front and rear axles 2 and 3 respectively. The front axle has the front or steering wheels 4 controlled by means of the usual steering arms 5 and steering rod 6. The motor 7 is supported upon the frame near the forward end of the same and has a crank shaft extending into the transmission gear box 9. The driving shaft 8 is arranged to be connected with the motor by means of a clutch 8ª, and has a universal joint connection 10 with the differential 11 mounted upon the rear axle. The latter has the usual rear or driving wheels 12.

I provide a casing 13 preferably carried by the chassis in front of the motor. The casing 13 may be formed from any suitable material such as sheet steel, aluminum or the like. A spindle 14 is journaled in a suitable bearing 15 formed in one of the walls of the casing 13 and extends therebeyond. In the form of the device shown in the illustration a sprocket 16 is rigidly mounted upon the spindle and is operatively connected by means of a chain 17 with a second sprocket 18 rigid with the driving crank shaft. It should be noted that it is not necessary to employ a separate spindle 14 as the latter may consist of a part of the crank or the cam shaft of the motor. With this arrangement the casing is so disposed that the crank or cam shaft extends therethrough and the sprockets and chain are then of course unnecessary. Within the casing 13 the spindle 14 carries a rigid disk 19 keyed or otherwise secured thereto. The disk 19 has an annular offset portion 20 concentric with the spindle and presenting integral lugs 21. A second disk 22 is loosely arranged upon a neck 23 of the disk 19, concentric with the spindle 14, and is recessed to receive the disk 19. The disk 22 further has an annular offset portion 24 registering substantially with the offset portion 20 of the disk 19 and forming with the same a substantially annular opening between the disks. The portion 24 of the disk 23 has lugs 25 similar to the lugs 21. Helical springs 26 are arranged in the opening between the disks, and between the lugs of the respective disks, as is shown most clearly in Fig. 7. By means of the rigid disk 20 a movement of the spindle 14 is transmitted to the disk 22 but the springs permit the transmission of the movement to be effected resiliently; that is, a sudden starting or stopping of the spindle is not transmitted to the disk 22 immediately, the springs permitting the disk 22 a certain play with respect to the disk 20.

A crank disk 27 is loosely mounted upon the spindle 14 adjacent to the disk 22 and is held in position by means of a nut 28 arranged upon a suitably threaded end of the spindle. At the face adjacent to the disk 22 the crank disk has an annular projection 29 provided at the outside with a notch 30 presenting a shoulder 31. A dog 32, having a blunt extremity, is pivotally mounted upon the disk 22 adjacent to the crank disk. The dog 32 has oppositely-extending arms 33 and 34 respectively. A spring 35 is arranged between the arm 34 and the disk 22 and holds the dog in any position against casual movement. A stop 36 is arranged to limit the movement of the dog and is received by a suitable edge recess of the arm 34. The arms 33 and 34 do not lie in the same plane, the former being offset from the plane of the dog and the arm 34, and lying adjacent to the disk 22. The arrangement is such that when the dog 32 is inwardly disposed it engages the recess 30 of the crank disk, which then rotates with the spindle. When the dog is out of engagement with the recess the spindle revolves freely without transmitting its movement to the crank disk.

An air compressor cylinder 37 is arranged within the casing 13 near one end of the same and is secured thereto. It has a piston 38, a piston rod 39 and a connecting-rod 40; the latter is secured by means of a crank pin 41 to the crank disk 27. The cylinder has inlet and outlet valves 42 and 43, respectively, at each end. The inlet valves are joined by means of piping 44 to an inlet cup 45 having strainers 46 and filtering material 47, which free the air drawn into the compressor from impurities. The outlet valves 43 are joined by means of piping 49 with an air conduit system 50, by means of which air is distributed to the tires, as will appear more clearly hereinafter. The conduit system has a safety valve 51 to prevent the pressure therein from becoming excessive.

A shaft 52 is revolubly arranged in bearing brackets 53 at the side of the casing 13 and carries rigid disks or rollers 54. The latter are arranged to engage the arms 33 and 34 of the dog 32, and operate the same to throw it into engagement with the recess of the crank shaft or displace it therefrom. Thus in one position of the shaft 52 the roller 54 engages the arm 33 of the dog to throw the latter into engagement with the recess 30. In another position of the shaft the other of the rollers 54 engages the arm 34 to swing the dog outwardly and to displace it from the recess. The lower end of the shaft has a neck operatively embraced by a hook 55 at the end of a swinging arm 56 pivotally mounted between posts 57. One of the latter has a rigid pivot point and the other an adjustable pivot point, engaging at the ends of a cross-bar 58 rigid with the swinging arm 56. The arm 56 extends between the coils of two double coil magnets 59 and 60, respectively. The cores 61 and 62 of these magnets lie underneath the arm and attract the same when one or the other of the magnets is energized. At the end remote from the swivel connection 55 the arm has insulated, oppositely-disposed contact fingers 63 and 64 adapted to engage adjusting points 65 and 66 respectively, of posts 67 and 68, each mounted on a suitable insulating base. A binding post 69 upon the arm 56 is electrically connected with a suitable source 70 of electrical supply and is insulated with respect to the arm. The post 68 is connected by a suitable conductor with the coils of the magnet 59 which are also electrically connected by a suitable conductor with a post 71 having an adjustable contact point 72 and arranged upon a suitable insulating base. A similar post 73 has an adjustable contact point 74 and is electrically connected with the coils of the other magnet 60. The latter are also connected by means of a suitable conductor with the post 67. These connections are shown most clearly in the diagrammatic outline shown in Fig. 4.

A controller arm 75 is pivotally mounted upon an insulating base 76 and has a binding post 77 which is electrically connected by means of a suitable conductor with the source 70 of electrical supply. The controller arm has a head 78 arranged between the adjustable contact points 72 and 74 and adapted to place either of the latter in electrical connection with the controller arm.

A bracket 79 having a chamber 80 is rigidly mounted upon the bottom of the casing 13 and carries a Bourdon tube 81 the open end of which is rigidly secured in an opening of the chamber 80 and communicates interiorly therewith. The Bourdon tube is curved to embrace the coils and at the free end has a wing 82 which is pivoted to a link 83 rigidly secured to a block 84 adjustably mounted to swing on an insulating plate 85 with the controller arm 75. The block 84 permits the adjustment of the pivotal connection between the link 83 and arm 75. A nut 76ª between the base 76 and the plate 85 serves to hold the base in position. A small tube 86 effects an interior communication between the chamber 80 and the air conduit system 50. The Bourdon tube which is preferably of oval cross-section, is of the usual type and tends to straighten out with an increase of pressure therein and to assume a position of greater curvature with a decrease of the pressure. Thus, an increase or a decrease of pressure in the air conduit is transmitted to the Bourdon tube and this in turn actuates the controller arm 75. The insulating base 76 which carries the controller arm is pivotally mounted and at one end has a pointer 87 which is used in connection with a curved, graduated scale 88 to indicate the predetermined pressure limits for the operation of the device, as will appear more clearly hereinafter.

It will be understood that it is essential to introduce the air from the compressing mechanism to the tires without interrupting the operation of the motor vehicle. As the tires are moving however, it is necessary to provide an air conduit to the tire, in which a joint is included of such nature that the revolution of the wheel is not interfered with. In Fig. 5 is illustrated my preferred construction of one of the front wheel hubs of an automobile wheel used in connection with my invention. The front axle 2 pivotally carries an axle spindle 90 which is controlled by the usual steering knuckle 91. The wheel hub 92 is revolubly mounted upon the spindle by means of suitable ball bearings 93 and 94. The inner race of the outer bearing 94 is screwed upon the threaded end of the spindle and is further held in position by a collar 95. A cover 96 is screwed upon the properly threaded end of the hub and has an opening to receive the end of the spindle. The spindle has a longitudinal opening 97 therethrough which communicates by means of a flexible connection 98 with the air conduit 99 from the compressing mechanism. A rounded cap 100 has its inner face provided with a threaded opening, and is screwed upon the correspondingly threaded end of the spindle. The cap is preferably rounded and has a substantially central opening 101. Within the cap, adjacent to the outer end is arranged a correspondingly formed cup 102 which fits closely within the cap and has a tube extension 103 projecting through the opening 101. The extension 103 is connected with an air duct 104 leading to the inlet valve of the tire and serving for the introduction of the air into the latter. It will be understood that the cup of the hub is revoluble relatively to the cap 100 and as both these parts are formed to permit a close surface engagement there is substantially no leakage through the joint. The cup has a crosspiece 105 against which presses a spring 106, the opposite end of which rests against the face of the cup and which serves to press the cup and the cap into close engagement. The air from the compressing mechanism is introduced to the interior of the cap through the hollow spindle and from the cap flows through the air duct to the tire. In Fig. 6 is illustrated the form of the hub used in connection with the rear wheel of the vehicle. The axle spindle 90 is not journaled in ball bearings and is rigidly secured to the wheel hub as the axle is positively driven by the motor. The cap and the cup are similar in form to those shown in Fig. 5, the spring 106 however, resting directly against a felt or other washer 106ª at the end of the spindle. The air conduit permitting the introduction of the air to the cap has the end located at the cup 102. The air duct 104 to the tire is arranged in an inlet opening 107 of the cap itself.

The operation of my device is as follows: As long as the tires are inflated to the predetermined limit, the device remains inoperative. Should a puncture or similar accident permit the escape of air from one of the tires the pressure in the air conduit system would immediately decrease and consequently, the pressure in the Bourdon tube would also become less. This decrease of pressure in the tube would permit the latter to assume a position of greater curvature and in doing so the controlling-arm would be operated through the link between the arm and the end of the tube. The arm would be swung into position to engage the contact 74, thereby throwing the source of electricity 70 and the magnet coil 60 into electrical connection through the swinging arm and the contact-finger 64, which is in engagement with the adjustable contact 66. When the coil 60 is energized its armature attracts the swinging arm and pulls the latter upward, breaking the contact between the contact finger 63 and the contact 66 and thus opening the circuit. As the arm swings upward, it moves with it the shaft 52 and swings one of the rollers 54 in position so that the dog 32 is thrown into engagement with the recess 30, thereby operatively connecting the disk 22, which is revolving with the shaft 14, and the crank disk 27. Through the latter, together with the connecting parts, the pump is operated and air is forced through the air conduit system into the tires. Adjacent to the swinging arm is a post 108, which carries a band spring 109 so formed that it holds the arm 56 in whichever position it happens to be and resiliently resists the displacement of the arm from that position; thus when the arm has been brought into contact with one of the coils it is held in that position after the coil has been deenergized until the other coil is energized to swing the arm into another position. When the tires have been inflated to the predetermined point, the pressure of the air within the Bourdon tube swings the controlling arm into engagement with the other adjustable contact 72, thereby effecting an electrical connection between the source of electrical supply and the coil 59, through the contact-finger 63 and the adjustable contact 65. As soon as the coil 59 is energized, it attracts the swinging arm and draws the latter downward, breaking the circuit at the contact-finger 63 and the contact 65. This movement of the swinging arm forces the shaft 52 downward and throws the other of the rollers 54 into position to displace the dog 32 from the recess 30, thereby permitting the free relative movement of the disk 22 and the crank disk. In this way the operation of the pump is stopped when the air pressure reaches a predetermined point.

The insulating base 76 is pivotally mounted and can be arranged in a plurality of positions. It will be understood that as its position is shifted its relation to the Bourdon tube is altered and consequently the controlling arm will be operated differently in different positions of the base. For instance, in one position of the base a certain pressure within the Bourdon tube will operate the arm, while in a different position of the base a higher or a lower pressure within the tube would be required. Consequently, the pressure limit controlling the operation of the mechanism can be adjusted by swinging the base of the controlling arm. The scale 88 is calibrated in accordance with the different pressures and thus the operating pressure limits can be easily adjusted and predetermined by shifting the insulating base in accordance with the figures indicated upon the scale. Further adjustment of the parts in possible by separating or approaching the contacts 72 and 74, and 65 and 66.

If so desired, the valves of the tires can be eliminated or provided with weak springs in order to permit a comparatively free entrance of the air from the compressor. The tube connecting the air conduit system and the Bourdon tube should be of small cross-section, to render the Bourdon tube practically independent of variations in air pressure due to the compression of the tires in travelling over rough roads and the like. The valves at the wheels should not be airtight, in order to prevent the tires from being inflated to a point which might cause them to burst.

Having thus described my invention I claim as new and desire to secure by Letters Patent:—

1. In combination with a vehicle having driving mechanism, of an air compressor a continuously rotating shaft driven by the driving means of the vehicle, a disk secured to the shaft, a second disk having a yielding connection therewith, a third disk having a pawl and ratchet connection with the second disk, a connection between the compressor and the third disk for operating said compressor, a reservoir, a Bourdon tube in communication with the reservoir, a longitudinally movable shaft provided with rollers for operating the pawl to connect and disconnect the second disk and the third disk, a swinging lever for moving the shaft, a pair of magnets for moving the lever in one direction, a second pair of magnets for moving the lever in the other direction, a source of electrical supply, a controlling arm connected with the Bourdon tube and operated by the same for connecting either of said sets of magnets with the source of electrical supply, a spring for holding the swinging lever in adjusted position, a base upon which the arm is mounted, means for shifting the base whereby to vary the position of the arm with respect to the Bourdon tube, a scale, and a pointer on the base for coöperating with the scale.

2. In combination with a vehicle having driving mechanism, of an air compressor, a continuously rotating shaft driven by the driving mechanism of the vehicle, a disk secured to the shaft, a second disk having a yielding connection therewith, a third disk having a pawl and ratchet connection with the second disk, a connection between the compressor and the third disk for operating said compressor, a reservoir, a Bourdon tube in communication with the reservoir, means for operating the pawl to connect and disconnect the second disk and the third disk, a swinging lever for actuating said means, a pair of magnets for moving the lever in one direction, a second pair of magnets for moving the lever in the other direction, a source of electrical supply, a controlling arm connected with the Bourdon tube and operated by the same for connecting either of said sets of magnets with the source of electrical supply, a spring for holding the swinging lever in adjusted position, a base upon which the arm is mounted, means for shifting the base whereby to vary the position of the arm with respect to the Bourdon tube, a scale, and a pointer on the base for coöperating with the scale.

3. In combination with a vehicle having driving mechanism, of an air compressor, a continuously rotating shaft driven by the driving mechanism of the vehicle, a disk secured to the shaft, a second disk having a yielding connection therewith, a third disk having a pawl and ratchet connection with the second disk, a connection between the compressor and the third disk for operating said compressor, a reservoir, a Bourdon tube in communication with the reservoir, means for operating the pawl to connect and disconnect the second disk and the third disk, a swinging lever, means for moving the lever in one direction to actuate said pawl operating means, means for moving the lever in the other direction, an operating means for both of said means, a controlling arm connected with the Bourdon tube and operated by the same for connecting either of said means with the operating means, and a spring for holding the swinging lever in adjusted position.

4. In combination with a vehicle having driving mechanism, of an air compressor, a continuously rotating shaft driven by the driving mechanism of the vehicle, a disk secured to the shaft, a second disk having a yielding connection therewith, a third disk having a pawl and ratchet connection with the second disk, a connection between the compressor and the third disk for operating said compressor, a reservoir, a Bourdon tube in communication with the reservoir means for operating the pawl to connect and disconnect the second disk and the third disk, a swinging lever, means for moving the lever in one direction to actuate said pawl operating means, means for moving the lever in the other direction, an operating means for both of said means, and a controlling arm connected with the Bourdon tube and operated by the same for connecting either of said means with the operating means.

5. In combination with a vehicle having driving mechanism, of an air compressor, a continuously rotating shaft driven by the driving mechanism, an operating mechanism for the compressor, means for connecting and disconnecting the shaft and the operating mechanisms, a swinging lever for actuating said means, a pair of magnets for moving the lever in one direction, a second pair of magnets for moving the lever in the other direction, a source of electrical supply, a reservoir, a Bourdon tube in communication with the reservoir, a controlling arm connected with the Bourdon tube and operated by the same for connecting either of said sets of magnets with the source of electrical supply, a spring for holding the swinging lever in adjusted position, a base upon which the arm is mounted, said base having contacts for engagement by the arm to connect the sets of magnets with the source of electrical supply, means for shifting the base whereby to vary the position of the arm with respect to the contacts, a scale, and a pointer on the base for coöperating with the scale.

6. In combination with a vehicle having driving mechanism, of an air compressor, a continuously rotating shaft driven by the driving mechanism of the vehicle, a disk secured to the shaft, a second disk having a yielding connection therewith, a third disk having a pawl and ratchet connection with the second disk, a connection between the compressor and the third disk for operating said compressor, a reservoir, a Bourdon tube in communication with the reservoir, means for operating the pawl to connect and disconnect the second disk and the third disk, a swinging lever, means for moving the lever in one direction to actuate said pawl operating means, means for moving the lever in the other direction, an operating means for both of said means, a controlling arm connected with the Bourdon tube and operated by the same for connecting either of said means with the operating means, and a spring for holding the swinging lever in adjusted position.

7. In combination with a vehicle having driving mechanism, of an air compressor, a continuously rotating shaft driven by the moving mechanism of the vehicle, a disk secured to the shaft, a second disk having a yielding connection therewith, a third disk having a pawl and ratchet connection with the second disk, a connection between the compressor and the third disk for operating said compressor, a reservoir, a Bourdon tube in communication with the reservoir, means for operating the pawl to connect and disconnect the second disk and the third disk, a swinging lever, means for moving the lever in one direction to actuate said pawl operating means, means for moving the lever in the other direction, an operating means for both of said means, and a controlling arm connected with the Bourdon tube and operated by the same for connecting either of said means with the operating means.

In testimony whereof I have signed my name to this specification in the presence of two subscribing witnesses.

WILLIAM A. VINSON.

Witnesses:
CHARLES E. NIXON,
CHARLEY E. CHURCHMAN.